UNITED STATES PATENT OFFICE.

ROBERT E. SCHMIDT, OF ELBERFELD, GERMANY, ASSIGNOR TO THE FARBENFABRIKEN, VORMALS FR. BAYER & CO., OF SAME PLACE.

ALIZARINE DERIVATIVE.

SPECIFICATION forming part of Letters Patent No. 446,892, dated February 24, 1891.

Application filed October 31, 1890. Serial No. 369,973. (No specimens.)

*To all whom it may concern:*

Be it known that I, ROBERT E. SCHMIDT, doctor of philosophy, chemist, and assignor to THE FARBENFABRIKEN, VORMALS FR. BAYER & CO., a subject of the Emperor of Germany, residing at Elberfeld, Germany, have invented a new and useful Improvement in the Manufacture of Alizarine Derivatives, of which the following is a specification.

My invention relates to the production of a new alizarine derivative called "alizarine cyanine" by oxidizing the product invented by me and called "alizarine bordeaux," which I have described and claimed in a separate application, Serial No. 369,979, filed concurrently herewith, and which is produced by oxidizing alizarine (dioxyanthraquinone) with fuming sulphuric acid to tetraoxyanthraquinone. I have found that this alizarine bordeaux leads to another valuable dye-stuff by again oxidizing it in another way and by employing the same reaction as is employed in producing the known dye-stuff purpurine from alizarine. A new coloring-matter is then obtained, which is entirely different from alizarine purpurine or alizarine bordeaux.

In carrying out my process practically I proceed as follows: Ten parts, by weight, of dry pulverized alizarine bordeaux are dissolved in two hundred parts, by weight, of sulphuric acid at 66° Baumé, and twelve parts, by weight, of finely-pulverized manganese are gradually introduced under continual stirring into this solution. The reaction taking place under a rise of temperature is to be observed by the progressive change of the color of the sulphuric-acid solution from violet to blue, and is ended when the color of this solution ceases to change under prolonged action or heating to one hundred degrees (100°) centigrade. The mixture is then poured into water, boiled, filtered, and washed. The precipitate is redissolved in hot diluted alkali, the alkaline solution filtered, and the new coloring-matter precipitated therefrom with acids. Instead of manganese in this process other oxidizing agents, such as arsenic acid, may be employed with the same result. My new product, called "alizarine cyanine," thus obtained forms a red-brown paste, which may be directly employed for dyeing or printing purposes. It is insoluble in water, but easily soluble in soda-lye with a blue color. In concentrated sulphuric acid it gives a solution of a pure blue with a red fluorescence. In glacial acetic acid it dissolves with a yellowish-red color, showing a moss-green fluorescence, and crystallizes from it in beautiful dark needles of greenish luster. In alcohol it dissolves with a blue color and crystallizes from it in blackish-brown glittering needles. In nitro-benzole it dissolves very easily and crystallizes in needles, the analysis of which agrees with pentaoxyanthraquinone.

Alizarine cyanine dyes mordants in shades which are remarkable for their great purity and which are totally different from those produced with alizarine bordeaux. For example, a clear violet is obtained with alumina mordants, and a clear greenish-blue with chromium mordants.

Having thus described my invention and in what manner it can be performed, that which I claim as new, and desire to secure by Letters Patent, is—

1. The process of producing a new alizarine derivative by oxidizing alizarine bordeaux (tetraoxyanthraquinone) in sulphuric-acid solution with oxidizing agents, such as manganese or arsenic acid, then boiling, filtering, and washing, and subesquently dissolving the precipitate in hot diluted alkali and filtering and precipitating the coloring-matter with acid, substantially as described.

2. As a new product, the coloring-matter herein described. which forms a red-brown paste, or dried a brown powder, derived from alizarine, insoluble in water, easily soluble in soda-lye with blue color tinged with violet, dissolves in concentrated sulphuric acid with a pure blue, the solution showing a beautiful fluorescence, and in glacial acetic acid or alcohol it dissolves with a more yellowish or bluish-red color of moss-green fluorescence and crystallizes from it in beautiful dark or blackish-brown glittering needles.

ROBERT E. SCHMIDT.

Witnesses:
WM. A. POLLOCK,
C. R. FERGUSON.